United States Patent
Wojciak et al.

(10) Patent No.: US 10,540,267 B2
(45) Date of Patent: Jan. 21, 2020

(54) TEST CASE DEFINITION AND VERIFICATION OF LOGICAL RESOURCES IN A COMPUTING ENVIRONMENT

(71) Applicant: INTERNATIONAL BUSINESS MACHINES CORPORATION, Armonk, NY (US)

(72) Inventors: Paul Wojciak, Poughkeepsie, NY (US); Ali Y. Duale, Poughkeepsie, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 12 days.

(21) Appl. No.: 15/987,141

(22) Filed: May 23, 2018

(65) Prior Publication Data

US 2019/0361799 A1 Nov. 28, 2019

(51) Int. Cl.
*G06F 9/44* (2018.01)
*G06F 11/36* (2006.01)
*G06K 9/62* (2006.01)

(52) U.S. Cl.
CPC ...... *G06F 11/3684* (2013.01); *G06F 11/3688* (2013.01); *G06F 11/3692* (2013.01); *G06K 9/6218* (2013.01)

(58) Field of Classification Search
CPC ....... G06F 11/34–3696; G06F 11/3684; G06F 11/3692; G06F 11/3688; G06K 9/6218
USPC ...................................................... 717/127
See application file for complete search history.

(56) References Cited

U.S. PATENT DOCUMENTS

| | | | |
|---|---|---|---|
| 9,032,373 B1 | 5/2015 | Gupta et al. | |
| 9,286,133 B2 | 3/2016 | Dusanapudi et al. | |
| 9,287,005 B2 | 3/2016 | Budhabhatti et al. | |
| 9,600,403 B1* | 3/2017 | Raz | G06F 11/3684 |
| 10,169,206 B2* | 1/2019 | Magre | G06F 11/3664 |
| 2015/0095608 A1 | 4/2015 | Dusanapudi et al. | |
| 2017/0060734 A1* | 3/2017 | Raz | G06F 11/3684 |
| 2018/0007175 A1* | 1/2018 | Tischart | G06F 8/30 |
| 2018/0137035 A1* | 5/2018 | Magre | G06F 11/3692 |

OTHER PUBLICATIONS

Anonymous, "A Method and System for Automating Designing, Debugging, and Maintaining Test Cases and Automation Test Scripts Synchronously", IPCOM000227697D Technical Disclosure, May 13, 2013, pp. 1-15.
Anonymous, "Integration of Combinatorial Test Design with Automated Testing to Develop Smart Automated Test Suites", IPCOM000240142D Technical Disclosure, Jan. 6, 2015, pp. 1-3.
(Continued)

*Primary Examiner* — Anna C Deng
(74) *Attorney, Agent, or Firm* — Cantor Colburn LLP; Steven Chiu

(57) ABSTRACT

Methods, systems, and computer program products for creating test cases are provided. Aspects include obtaining, by a processor, customer usage data from a plurality of customers. The customer usage data is analyzed to identify one or more outlier customer system configurations. A set of customer system attributes are extracted from the one or more outlier customer system configurations and new test cases are created based at least in part on the set of customer system attributes.

11 Claims, 7 Drawing Sheets

(56) References Cited

OTHER PUBLICATIONS

Anonymous, "Method and tool for measuring test-template variability", IPCOM000227917D Technical Disclosure, May 29, 2013, pp. 1-10.
Anonymous, "Method and system to optimize the execution of tests in a virtual environment", IPCOM000203472D Technical Disclosure, Jan. 26, 2011, pp. 1-4.
Y. Yamoto, "Performance-aware server architecture recommendation and automatic performance verification technology on IaaS cloud", SpringerLink, Nov. 2, 2016, pp. 1-15.

\* cited by examiner

TEST CASE DEFINITION AND VERIFICATION OF LOGICAL RESOURCES IN A COMPUTING ENVIRONMENT

BACKGROUND

The present invention generally relates to test cases, and more specifically, to test case definition and verification of logical resources in a computing environment.

Testing a hypervisor controlled computing system's functionality can be complicated and require intensive test resources. A hypervisor is a computer configuration that creates and runs virtual machines. A computer on which a hypervisor runs one or more virtual machines is called a host machine, and each virtual machine is called a guest machine. The hypervisor presents the guest operating systems with a virtual operating platform and manages the execution of the guest operating systems. Multiple configurations can be realized for customers operating a hypervisor which require test cases to be generated for a wide range of variables for a host of customers.

SUMMARY

Embodiments of the present invention are directed to a computer-implemented method for creating test cases. A non-limiting example of the computer-implemented method includes obtaining, by a processor, customer usage data from a plurality of customers. The customer usage data is analyzed to identify one or more outlier customer system configurations. A set of customer system attributes are extracted from the one or more outlier customer system configurations and new test cases are created based at least in part on the set of customer system attributes.

Embodiments of the present invention are directed to a system for creating test cases. A non-limiting example of the system includes a processor configured to obtain customer usage data from a plurality of customers. The customer usage data is analyzed to identify one or more outlier customer system configurations. A set of customer system attributes are extracted from the one or more outlier customer system configurations and new test cases are created based at least in part on the set of customer system attributes.

Embodiments of the invention are directed to a computer program product for creating test cases, the computer program product comprising a computer readable storage medium having program instructions embodied therewith. The program instructions are executable by a processor to cause the processor to perform a method. A non-limiting example of the method includes obtaining, by a processor, customer usage data from a plurality of customers. The customer usage data is analyzed to identify one or more outlier customer system configurations. A set of customer system attributes are extracted from the one or more outlier customer system configurations and new test cases are created based at least in part on the set of customer system attributes.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
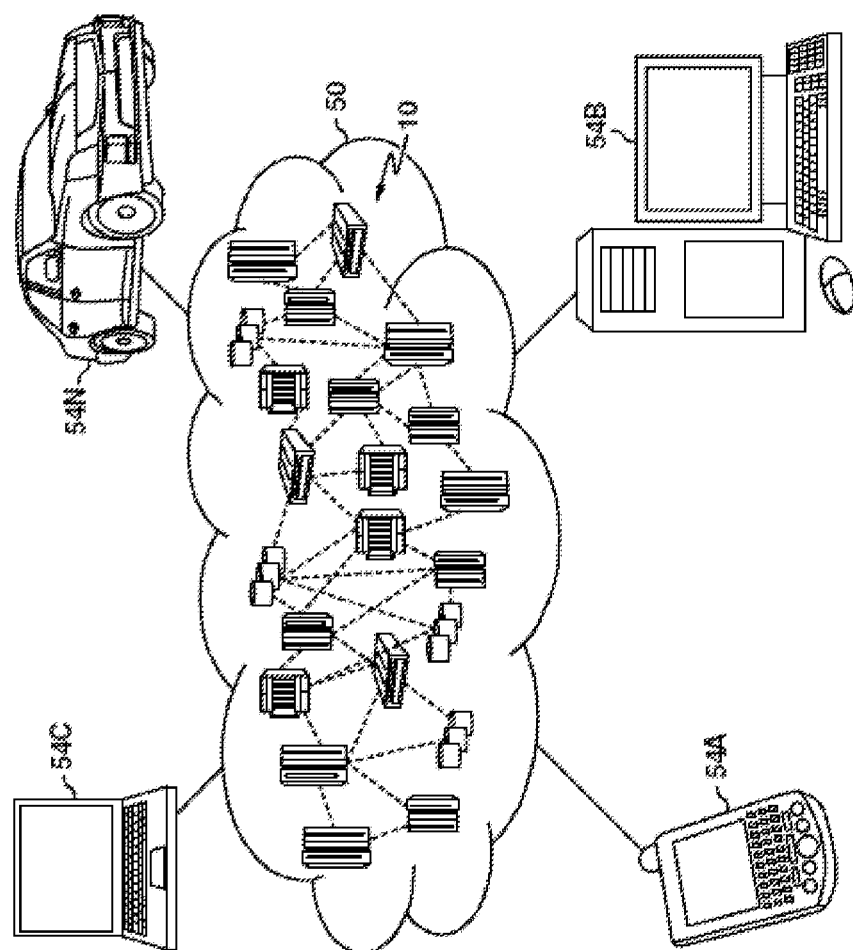
FIG. 1 depicts a cloud computing environment according to one or more embodiments of the present invention.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
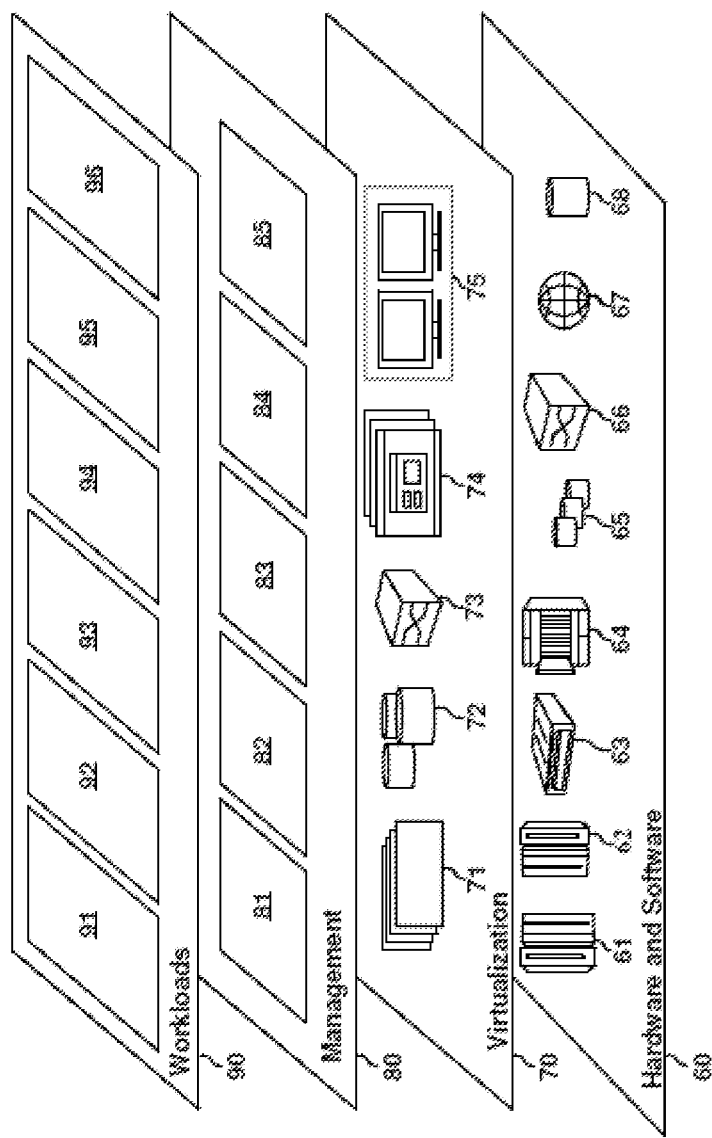
FIG. 2 depicts abstraction model layers according to one or more embodiments of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and test case definition and verification of logical resources in a computing environment 96.

Figure 3:
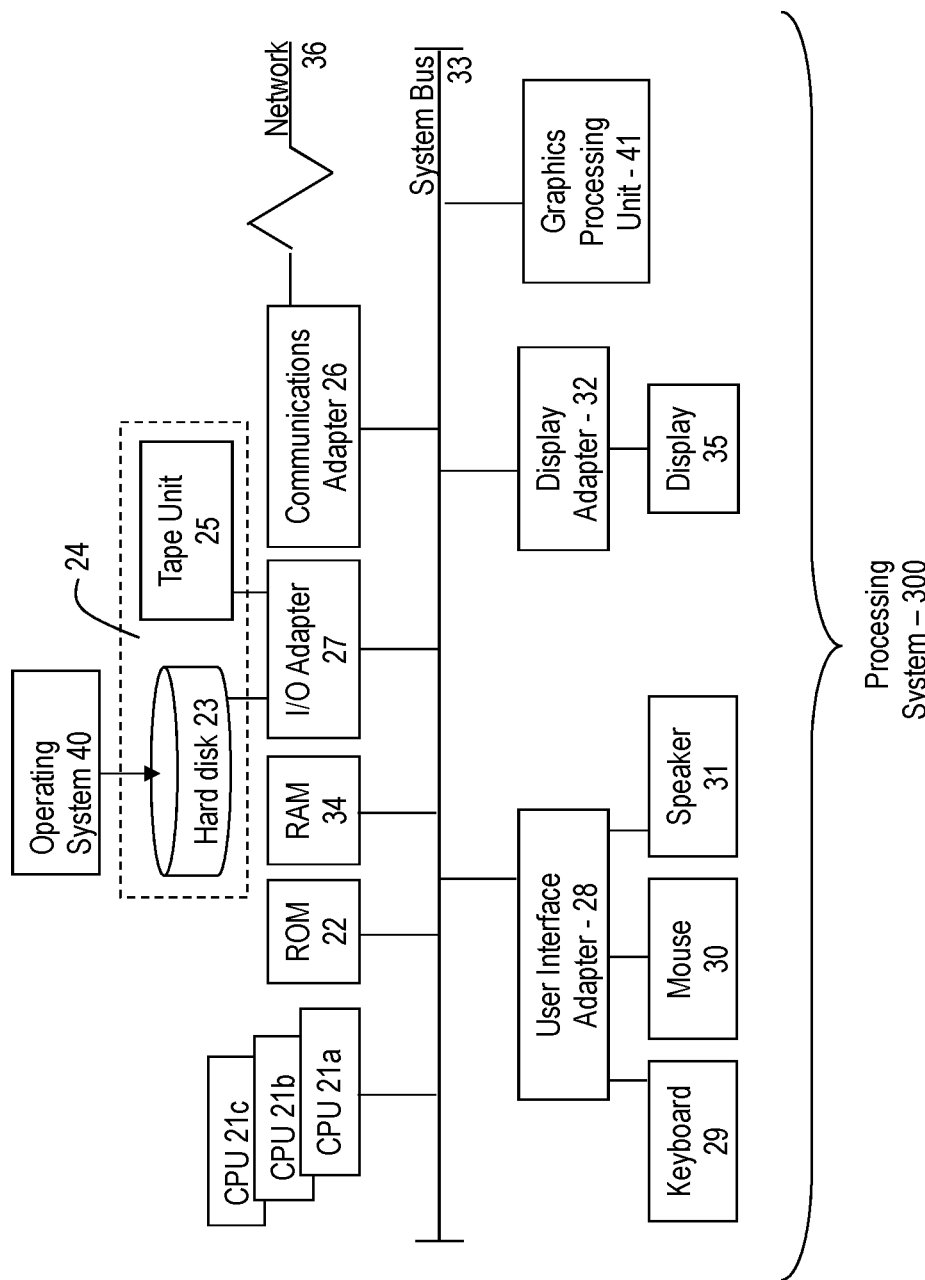
FIG. 3 depicts a block diagram of a computer system for use in implementing one or more embodiments of the present invention.

Referring to FIG. 3, there is shown an embodiment of a processing system 300 for implementing the teachings herein. In this embodiment, the system 300 has one or more central processing units (processors) 21a, 21b, 21c, etc. (collectively or generically referred to as processor(s) 21). In one or more embodiments, each processor 21 may include a reduced instruction set computer (RISC) microprocessor. Processors 21 are coupled to system memory 34 and various other components via a system bus 33. Read only memory (ROM) 22 is coupled to the system bus 33 and may include a basic input/output system (BIOS), which controls certain basic functions of system 300.

FIG. 3 further depicts an input/output (I/O) adapter 27 and a network adapter 26 coupled to the system bus 33. I/O adapter 27 may be a small computer system interface (SCSI) adapter that communicates with a hard disk 23 and/or tape storage drive 25 or any other similar component. I/O adapter 27, hard disk 23, and tape storage device 25 are collectively referred to herein as mass storage 24. Operating system 40 for execution on the processing system 300 may be stored in mass storage 24. A network adapter 26 interconnects bus 33 with an outside network 36 enabling data processing system 300 to communicate with other such systems. A screen (e.g., a display monitor) 35 is connected to system bus 33 by display adaptor 32, which may include a graphics adapter to improve the performance of graphics intensive applications and a video controller. In one embodiment, adapters 27, 26, and 32 may be connected to one or more I/O busses that are connected to system bus 33 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 33 via user interface adapter 28 and display adapter 32. A keyboard 29, mouse 30, and speaker 31 all interconnected to bus 33 via user interface adapter 28, which may include, for example, a Super I/O chip integrating multiple device adapters into a single integrated circuit.

In exemplary embodiments, the processing system 300 includes a graphics processing unit 41. Graphics processing unit 41 is a specialized electronic circuit designed to manipulate and alter memory to accelerate the creation of images in a frame buffer intended for output to a display. In general, graphics processing unit 41 is very efficient at manipulating computer graphics and image processing and has a highly parallel structure that makes it more effective than general-purpose CPUs for algorithms where processing of large blocks of data is done in parallel.

Thus, as configured in FIG. 3, the system 300 includes processing capability in the form of processors 21, storage capability including system memory 34 and mass storage 24, input means such as keyboard 29 and mouse 30, and output capability including speaker 31 and display 35. In one embodiment, a portion of system memory 34 and mass storage 24 collectively store an operating system coordinate the functions of the various components shown in FIG. 3.

Turning now to an overview of technologies that are more specifically relevant to aspects of the invention, hypervisor environments and mainframe computer system are becoming a common item for business organizations. Because of the inherent complexity of a hypervisor managed computing system, there are many combinations of environment configuration variables and values that would need to be tested. There are many hypervisor functions for logical resource management. Sequences of logical resource management operations interact with one another and the computing environment. As a consequence, the number of test variations required to thoroughly validate such a hypervisor controlled computing system becomes unaffordable in terms of time and test resources. Typically, a sequence of testing for a hypervisor needs a decision as to what needs to be tested. The tests need by created and then executed. And then the rest results need to be evaluated.

Turning now to an overview of the aspects of the invention, one or more embodiments of the invention address the above-described shortcomings of the prior art by application of customer usage data, aspects of the present invention can determine the range and most widely used logical resource variables and values to test. The customer usage data can be compared to test lab logical resource usage data to see where testing gaps might already exist. Test case variations can be derived through consideration and comparison of customer and test lab usage data. Test cases to execute can be obtained through a combinatorial test definition (CTD) method. Advantages of such a method include limiting the test variations to be executed to the necessary minimum while avoiding gaps in test coverage.

Once the hypervisor controlled computing system test cases are chosen, their execution must be driven by some means. The test cases can be performed manually and directly by a tester, through a separate framework controlling the system under test, or through a computer program running within the logical partitions of the system under test.

Having a computer program running within the logical partitions of the system under test allows direct monitoring of hypervisor operation and testing results. Control of logical resources within the configuration by the computer program can be driven through programming interfaces to the hypervisor. Test case definitions can be input to the computer program and used to drive the sequences of hypervisor operations to be tested.

Aspects of the present invention apply customer logical computing resource usage characteristics, variables, and values to generate test cases by making comparisons between customer and test lab logical resource usage data. These characteristics and variables are processed in a way that addresses the permutation explosion incumbent upon large logical resource environment testing by relying on combinatorial test design. However, by relying on CTD, the test cases generated by embodiments herein can be shown to be optimum for the chosen variables and characteristics. No existing test cases are required to exist to generate any new test cases. Embodiments of the invention apply computer program control for test case execution.

The above-described aspects of the invention address the shortcomings of the prior art by addressing challenges associated with testing the breadth of functionality of a hypervisor controlled computing system. One challenge includes how to best determine and define a set of test cases that validate the most important variables and their interactions for logical resources in a computing environment and do so using a minimum set of tests needed to achieve a specified level of test coverage. Another challenge includes how to execute defined test cases through a computer program running on the system under test.

Figure 4:
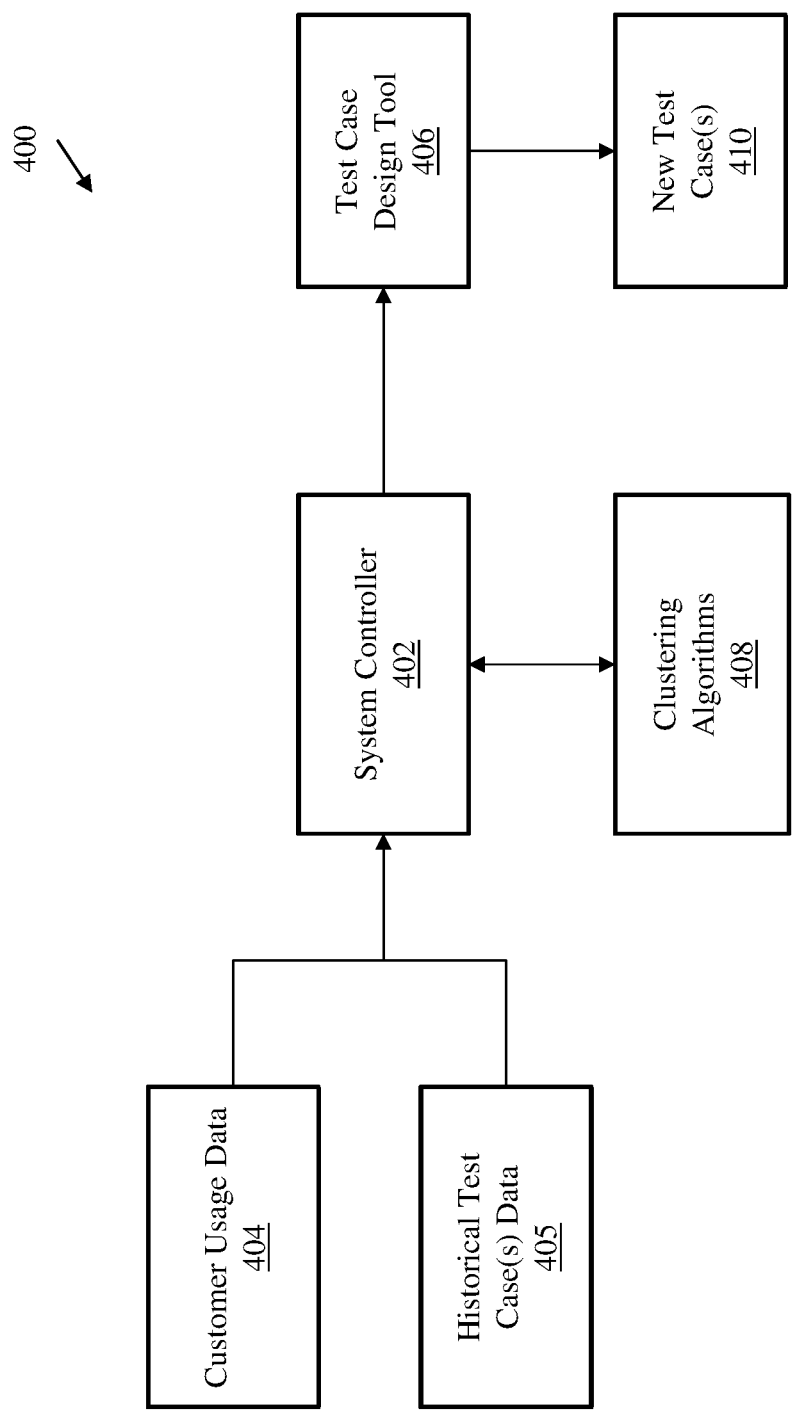
FIG. 4 depicts a system for creating test cases according to one or more embodiments of the invention.

Turning now to a more detailed description of aspects of the present invention, FIG. 4 depicts a block diagram of a system for test case definition and verification of logical resources according to one or more embodiments of the invention. The system 400 includes a system controller 402, customer usage data 404, historical test case(s) data 405, a test case design tool 406, a clustering algorithm 408, and new test case(s) definitions 410.

In one or more embodiments of the invention, the system controller 402 can be implemented on the processing system 300 found in FIG. 3. Additionally, the cloud computing system 50 can be in wired or wireless electronic communication with one or all of the elements of the system 400. Cloud 50 can supplement, support or replace some or all of the functionality of the elements of the system 400. Additionally, some or all of the functionality of the elements of system 400 can be implemented as a node 10 (shown in FIGS. 1 and 2) of cloud 50. Cloud computing node 10 is only one example of a suitable cloud computing node and is not intended to suggest any limitation as to the scope of use or functionality of embodiments of the invention described herein.

In one or more embodiments, the customer usage data 404 is obtained by the system controller 402 utilizing one or more system monitoring modules such as, for example, Call Home. The customer usage data 404 includes system configuration data about customer usage patterns. The system configuration data can include a customer's physical configuration and logical configurations. Physical configurations include a number of processors, memory capacity, adapter types, and the like. Logical configurations include a number of logical hosts running, number of logical systems running, and the like. In addition, the customer usage data 404 includes instruction stream and instruction pattern information from the customer system environment.

In one or more embodiments of the invention, the customer usage data 404 is analyzed by the system controller 402 to identify customer system configurations that are not representative in the historical test case data 405. Historical test case data 405 can include test cases developed for system configurations based on expected configurations for customer usage. For example, a test case can be developed for a mainframe system virtualized across a number of logical partitions. Expected partition sizes can range from 50 to 75 GBs of memory per partition. The historical test case data 405 can include test cases that are running on the system constraints that are expected. However, the customer usage data 404 can be outside this expected range. For example, for a mainframe system virtualized across logical partitions, some customers might have smaller partitions that are not typical of most customer systems such as less than a 1 GB partition. These type of customer system configurations can be considered outlier system configurations. The system controller 402, utilizing clustering algorithms 408, can compare the customer usage data 404 to the historical test case data 405 to determine a set of attributes with value ranges that can be utilized for developing the new test case(s) 410. In one or more embodiments, the set of attributes are determined based on the computing environment the customer is operating. Different attributes can be obtained for different computing systems.

In one or more embodiments, the clustering algorithms 408 can be used to highlight and depict the difference between a testing environment and the customer usage patterns. Clustering algorithms such as K-Means and Kohonen define predictor importance. Computing environment attributes analyzed by clustering may be ordered by predictor importance. Cluster attribute values may display distinct differences between customer computers and test lab computers. By selecting the attributes with the highest predictor importance and the values for those attributes from predominantly customer dominated clusters, the user finds attributes and values to input to the test case design tool. The clustering algorithm such as anomaly detection looks for outliers amongst the data. Attributes and values are grouped into peers by the algorithm. Peer clusters may display attributes and values whose composition is dominated by customer machines. By examining these anomalous peer groups, the user finds anomalous attributes and values to input to the test case design tool. The clustering algorithms can utilize a keyword that returns specific attributes about each customer system configuration. Some keyword searches can include a number of partitions, number of logical processor per partition, logical partition million service unit (MSU) capping value, logical partitions in main memory, and the like. Additionally, in one or more embodiments of the invention, keywords can be utilized to identify clusters that can be indicative of predictive power. Take, for instance, the following keywords: PU NUM, TEST MACHINE, and CRY ASSIST which may be strong indicators based on clustering. TEST MACHINE being a strong indicator might suggest that there are significant differences between customer and test lab computer systems. An analysis of the clusters of these keywords might lead to discovering that customer and test lab machines cluster separately. For the purpose of testing like a customer, this is very useful guidance suggesting that test lab computer configurations should be studied for modification.

In one or more embodiments, the set of attributes from the outlier customer system configurations can be inputted into the test case design tool 406 to develop and create new test cases 410 that cover the outlier system configurations. For example, a Combinatorial Test Design (CTD) to create a set of test cases can be utilized for the test case design tool 406. A CTD tool is given a description of a test space in the form of variables, their respective values, and possibly restrictions on the values combinations. The CTD tool may be provided with a functional coverage model defining the possible test space. CTD may select a subset of the possible tests that ensures coverage of all valid combinations of every two attributes (or every three, or four, etc.).

In one or more embodiments of the present invention, the system controller 402 analyzes the customer usage data 404 and historical test case data 405 obtained from the Call Home function. The clustering algorithms 408 are utilized by the system controller 402 to analyze the attributes and values, apply a score to the attributes and values, and assign metadata for each variable. The scored and ranked attributes and values are inputted into the test case design tool 406 which outputs the new test cases 410. The new test cases 410 can be executed by a computer program running on a system under test (SUT). The computer program tests the computing environment logical resource usage by dynamically configuring the system under test resources through an application programming interface (API). This computer program monitors the new test case 410 execution for any errors that occur on the system under test and provides results summarizing the execution of the new test cases 410.

Figure 5:
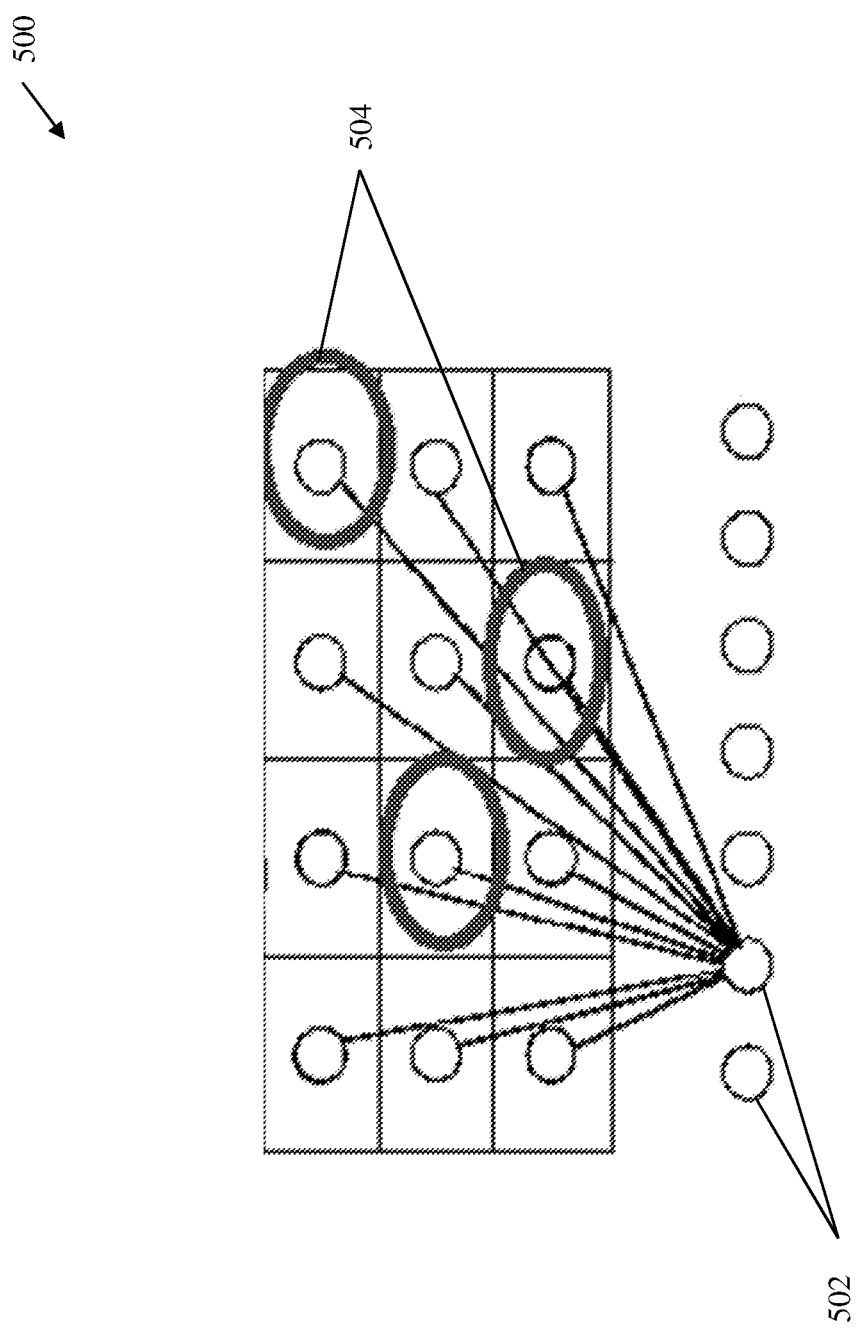
FIG. 5 depicts a flow diagram of a method for creating test cases according to one or more embodiments of the invention.
Figure 6:
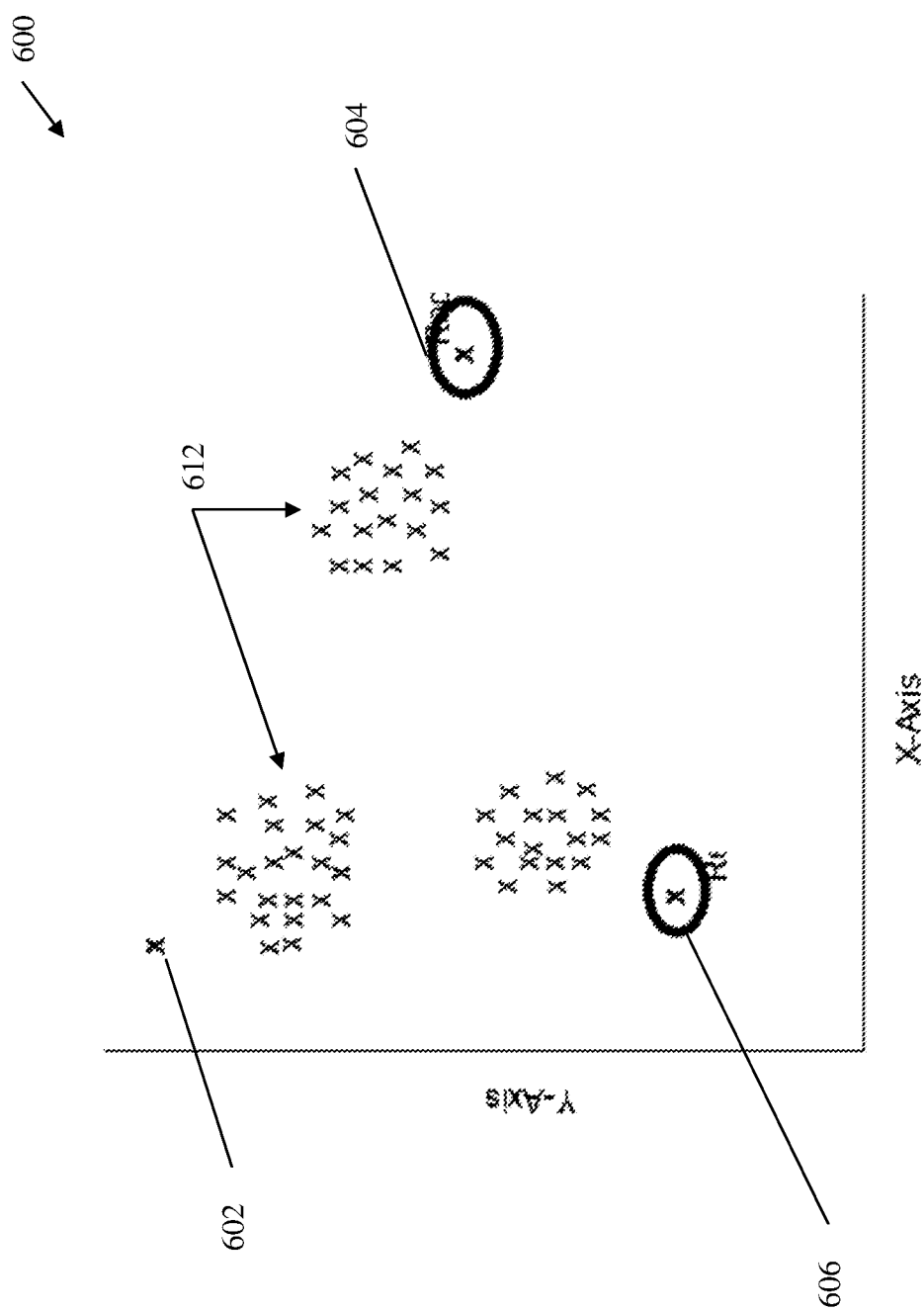
FIG. 6 depicts a diagram depicting the results of apply the second unsupervised learning algorithm to the output results of the first unsupervised learning algorithm according to one or more embodiments of the invention.

In one or more embodiments of the invention, outlier customer system configurations can include attributes and values that are of particular interest to test designers. To identify these outlier customer system configurations, the system controller 402 can utilize the clustering algorithms 408. The clustering algorithms 408 can be two different types of unsupervised learning algorithms applied to the customer usage data 404. The first unsupervised learning algorithm allows for the clustering of customer systems into distinct groups. Once clustered into distinct groups, the second unsupervised learning algorithm can perform anomaly detection unsupervised learning algorithms on the clustered data to identify the outlier customer system configurations. FIG. 5 depicts a diagram depicting the results of applying the first unsupervised learning algorithm according to one or more embodiments of the invention. The graph 500 includes input neurons 502 at the input layer of the graph 500 and an output map including customer machine only clusters 504. The unsupervised learning algorithm can be any type of clustering algorithm including but not limited to Kohonen and K-Means clustering algorithms. As shown in the illustrated example, the output map provides customer machine clusters 504 as distinct groups of customer systems. Each such distinct group 504 will be predominated by multiple customer machines with one or more strong predictors. (i.e., attributes with specific values). When the distinct groups 504 (e.g., clusters) formed contain all or almost all customer machines with no lab machines, the test designer can determine that the previous test environments are not representative of how the customer systems are actually being used by customers. The distinct groups 504 (e.g., clusters) typically have multiple customer machines. A single entity cluster does not typically arise from the clustering algorithms. The distinct groups 504 allow test designers to focus on these particular customer systems. FIG. 6 depicts a diagram depicting the results of apply the second unsupervised learning algorithm to the output results of the first unsupervised learning algorithm according to one or more embodiments of the invention. A results graph 600 includes the output of the second unsupervised learning algorithm to identify outlier customers systems 602, 604, 606 as compared to the clusters 612. These outlier systems 602, 604, 606 are identified and utilized to develop future test cases in the testing environments.

Figure 7:
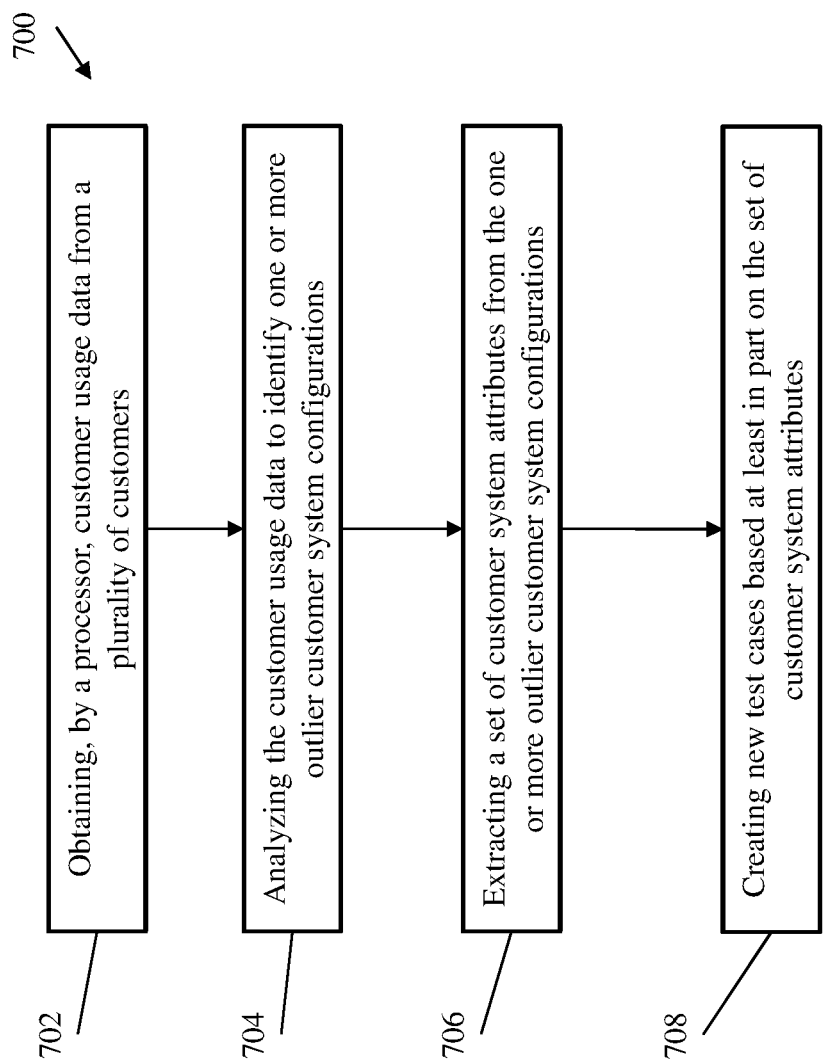
FIG. 7 depicts a flow diagram of a method for creating test cases according to one or more embodiments of the invention.

FIG. 7 depicts a flow diagram of a method for creating test cases according to one or more embodiments of the invention. The method 700 includes obtaining, by a processor, customer usage data from a plurality of customers, as shown in block 702. At block 704, the method 700 includes analyzing the customer usage data to identify one or more outlier customer system configurations. The method 700, at block 706, includes extracting a set of customer system attributes from the one or more outlier customer system configurations. And at block 708, the method 700 includes creating new test cases based at least in part on the set of customer system attributes Additional processes may also be included. It should be understood that the processes depicted in FIG. 7 represent illustrations, and that other processes may be added or existing processes may be removed, modified, or rearranged without departing from the scope and spirit of the present invention.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to CLEAN COPY OF THE SPECIFICATION an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method for creating test cases comprising:
    obtaining, by a processor, customer usage data from a plurality of customers;
    receiving historical test case data comprising historical test cases system parameters associated with the plurality of customers;
    analyzing the customer usage data to identify one or more outlier customer system configurations, wherein identifying the one or more outlier customer system configurations comparing the historical test case data to the customer usage data to identify one or more system configurations from the customer usage data that are outside a coverage of the historical test case data;
    extracting a set of customer system attributes from the one or more outlier customer system configurations by applying a clustering algorithm to the historical test cases system parameters and the one or more outlier system configurations to extract the set of customer system attributes; and
    creating new test cases based at least in part on the set of customer system attributes, wherein creating the new test cases comprises generating values for each customer system attribute in the set of customer system attributes, inputting the set of customer system attributes and the values for each customer system attribute into a test case design tool, and receiving the new test cases from the test case design tool.

2. The computer-implemented method of claim 1 further comprising:
    configuring a test system for the new test cases;
    executing the new test cases on the test system; and
    monitoring results of the new test cases on the test system.

3. The computer-implemented method of claim 1, wherein the test case design tool is a combinatorial test design (CTD) tool.

4. The computer-implemented method of claim 1, wherein the customer usage data comprises physical system configuration data, logical system configuration data, and instruction stream data.

5. A system for creating test cases comprising:
   a processor communicatively coupled to a memory, wherein the processor is configured to:
   obtain customer usage data from a plurality of customers;
   receive historical test case data comprising historical test cases system parameters associated with the plurality of customers:
   analyze the customer usage data to identify one or more outlier customer system configurations, wherein identifying the one or more outlier customer system configurations comparing the historical test case data to the customer usage data to identify one or more system configurations from the customer usage data that are outside a coverage of the historical test case data;
   extract a set of customer system attributes from the one or more outlier customer system configurations by applying a clustering algorithm to the historical test cases system parameters and the one or more outlier system configurations to extract the set of customer system attributes; and
   create new test cases based at least in part on the set of customer system attributes, wherein creating the new test cases comprises generating values for each customer system attribute in the set of customer system attributes, inputting the set of customer system attributes and the values for each customer system attribute into a test case design tool, and receiving the new test cases from the test case design tool.

6. The system of claim 5, wherein the processor is further configured to:
   configure a test system for the new test case;
   configure a test system for the new test cases;
   execute the new test cases on the test system; and
   monitor results of the new test cases on the test system.

7. The system of claim 5, wherein the test case design tool is a combinatorial test design (CTD) tool.

8. A computer program product for creating test cases, the computer program product comprising a computer readable storage medium having program instructions embodied therewith, wherein the computer readable storage medium is not a transitory signal per se, the program instructions executable by a processor to cause the processor to perform a method comprising:
   obtaining, by the processor, customer usage data from a plurality of customers;
   receiving historical test case data comprising historical test cases system parameters associated with the plurality of customers:
   analyzing the customer usage data to identify one or more outlier customer system configurations, wherein identifying the one or more outlier customer system configurations comparing the historical test case data to the customer usage data to identify one or more system configurations from the customer usage data that are outside a coverage of the historical test case data;
   extracting a set of customer system attributes from the one or more outlier customer system configurations by applying a clustering algorithm to the historical test cases system parameters and the one or more outlier system configurations to extract the set of customer system attributes; and
   creating new test cases based at least in part on the set of customer system attributes, wherein creating the new test cases comprises generating values for each customer system attribute in the set of customer system attributes, inputting the set of customer system attributes and the values for each customer system attribute into a test case design tool, and receiving the new test cases from the test case design tool.

9. The computer program product of claim 8 further comprising:
   configuring a test system for the new test cases;
   executing the new test cases on the test system; and
   monitoring results of the new test cases on the test system.

10. The computer program product of claim 8, wherein the test case design tool is a combinatorial test design (CTD) tool.

11. The computer program product of claim 8, wherein the customer usage data comprises physical system configuration data, logical system configuration data, and instruction stream data.

* * * * *